May 3, 1966   H. KUMMERMAN   3,249,236
TRANSFERABLE GUIDE PULLEYS FOR ROLLING OVERHEAD TELESCOPIC
BRIDGE OR GANTRY CRANE
Filed March 24, 1965   9 Sheets-Sheet 9
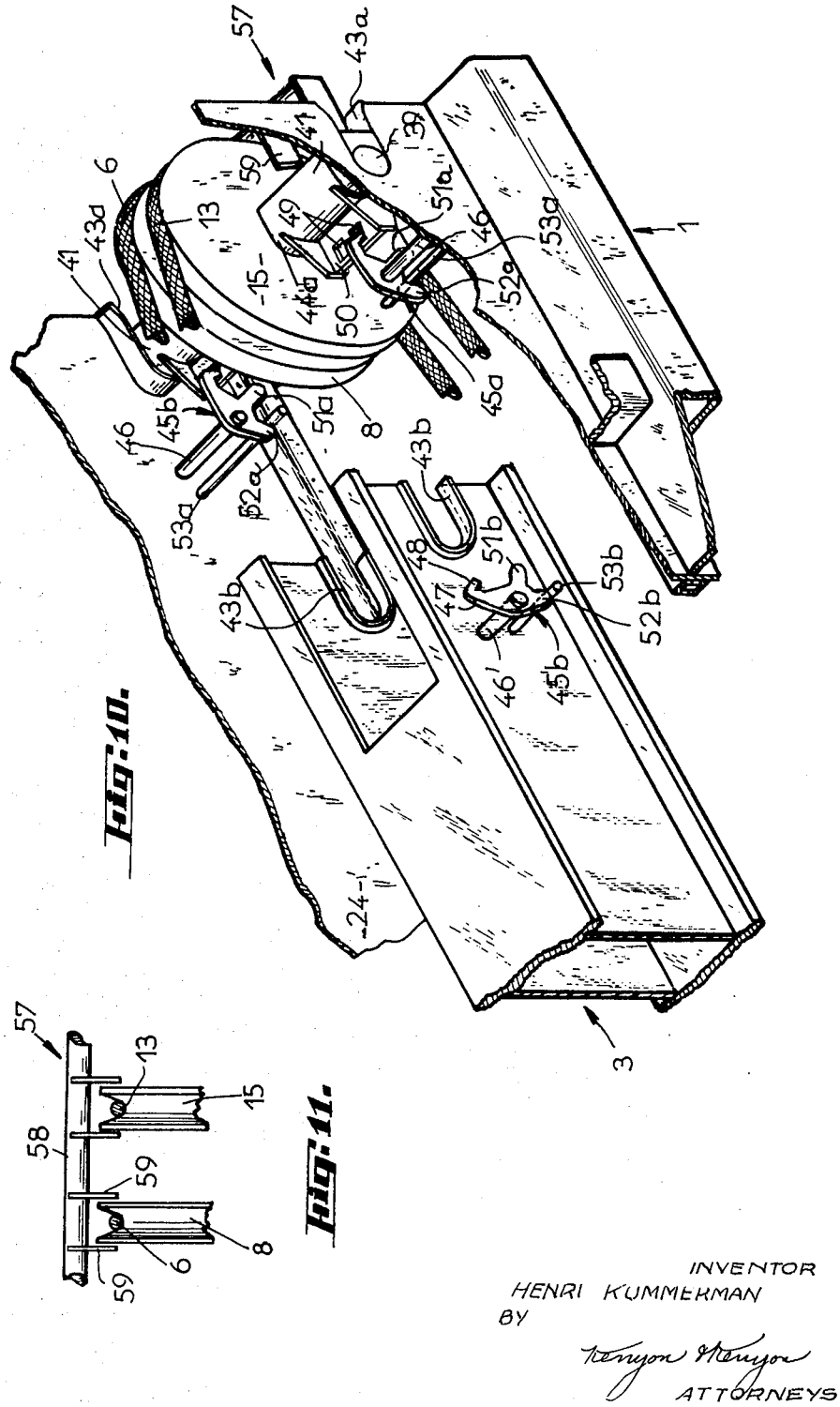
INVENTOR
HENRI KUMMERMAN
BY
ATTORNEYS

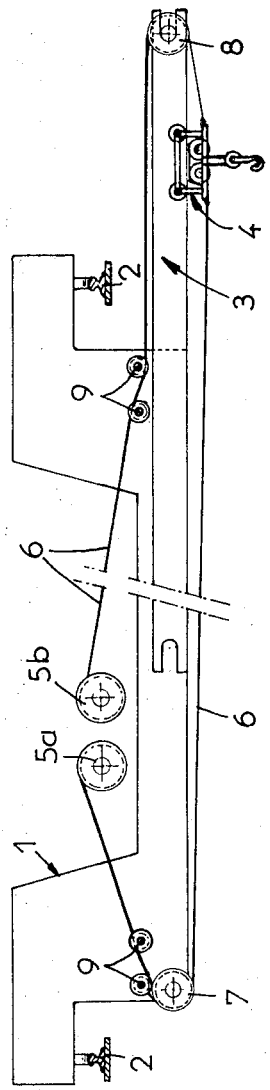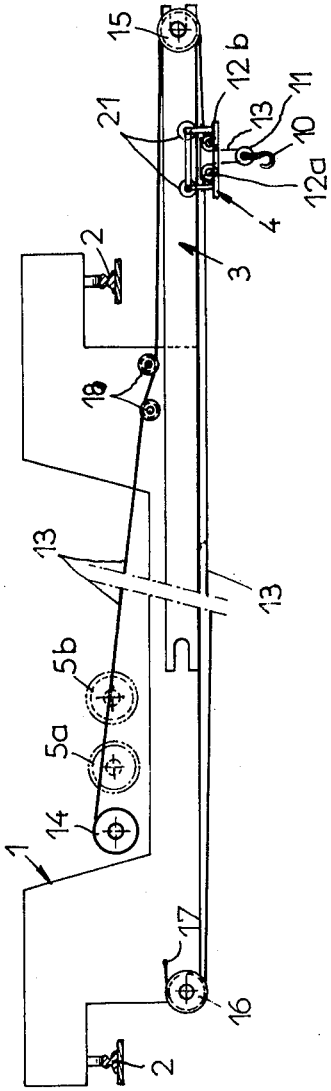

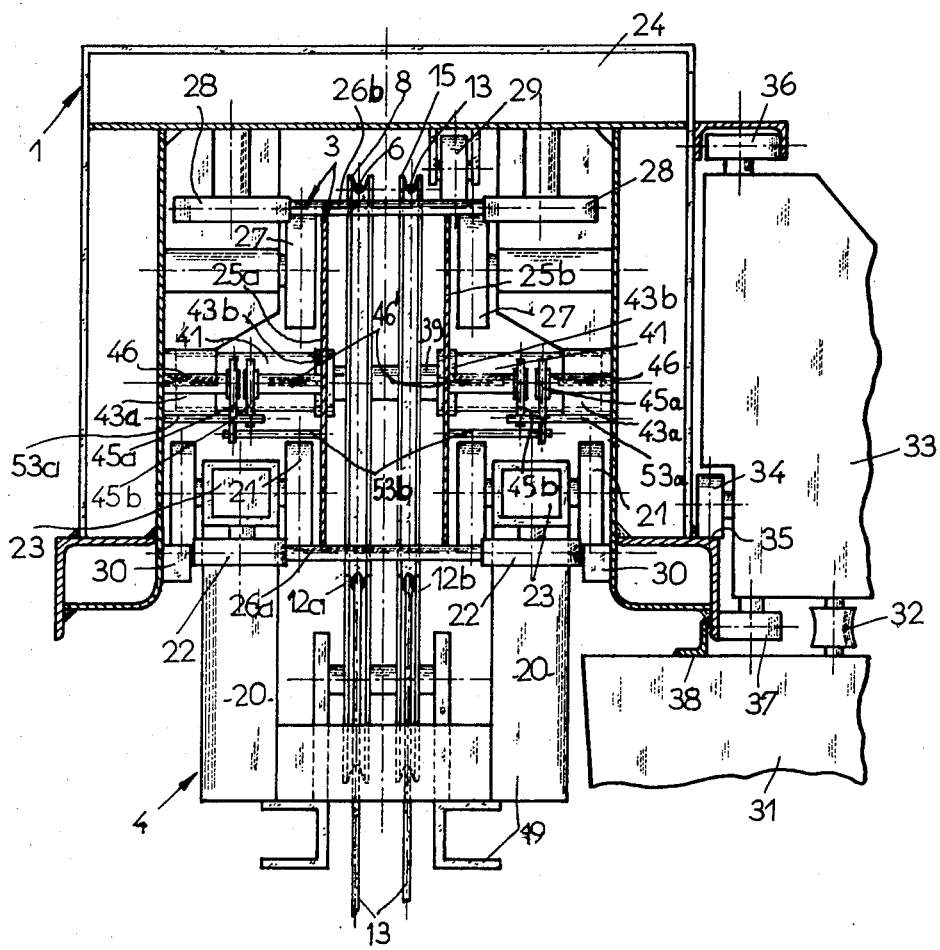

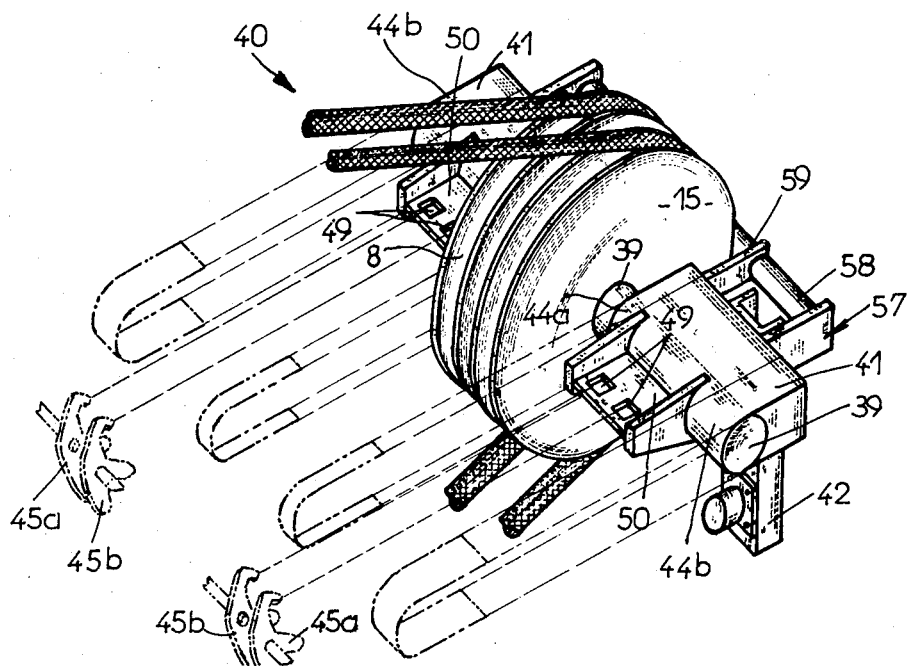

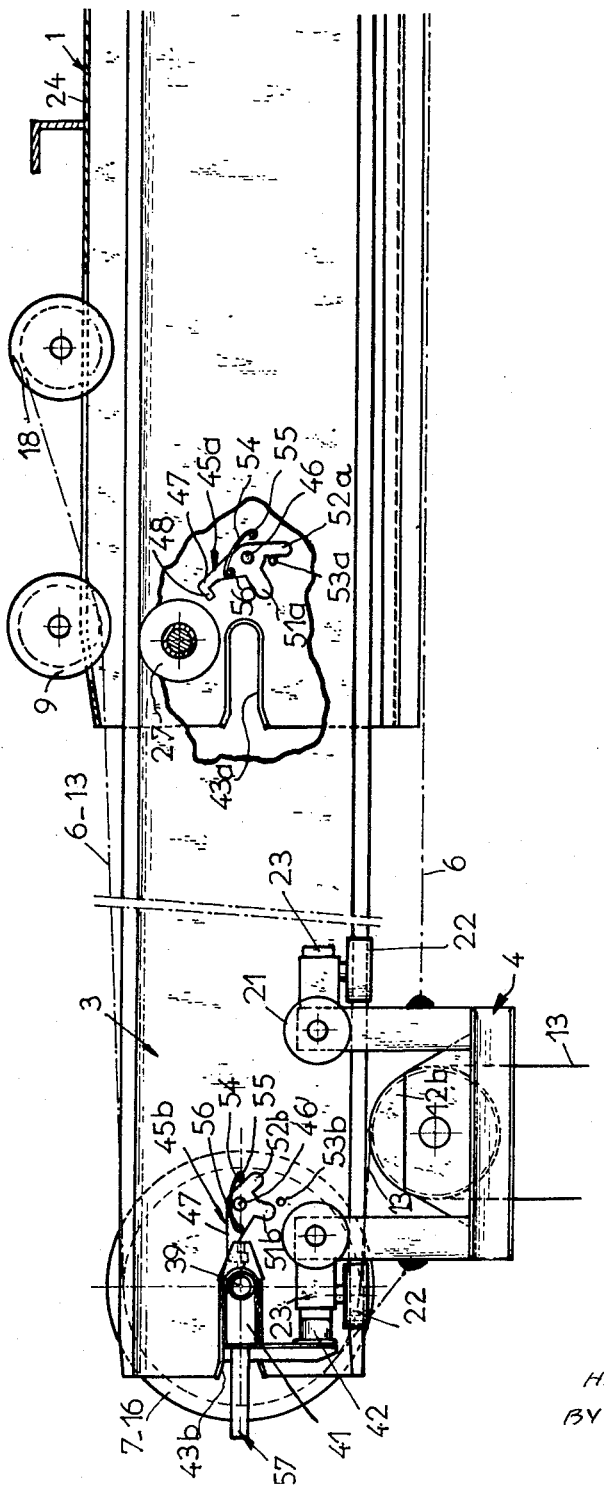

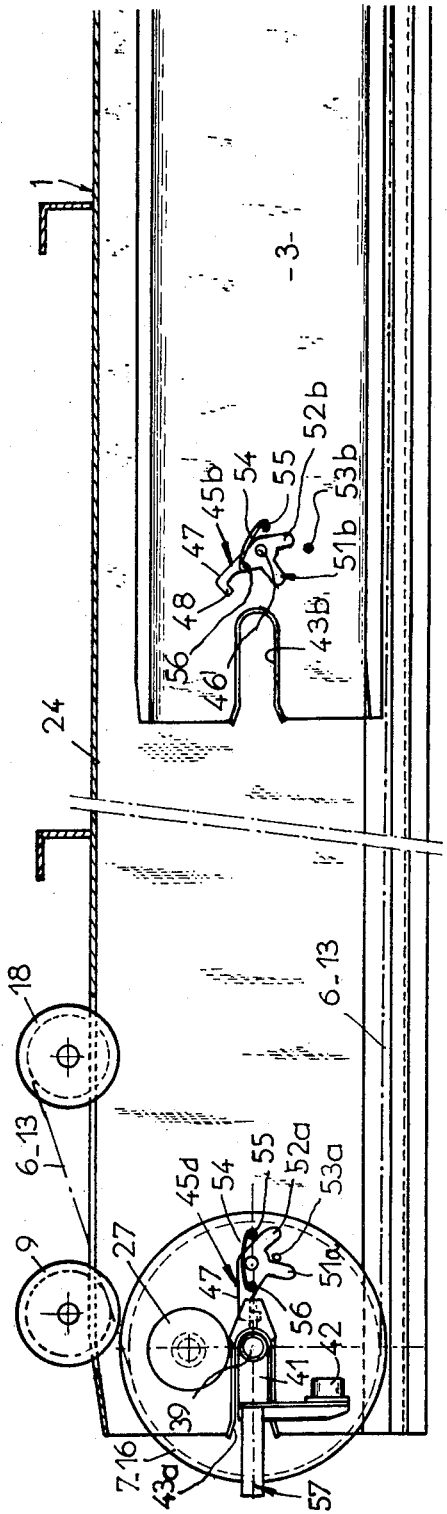

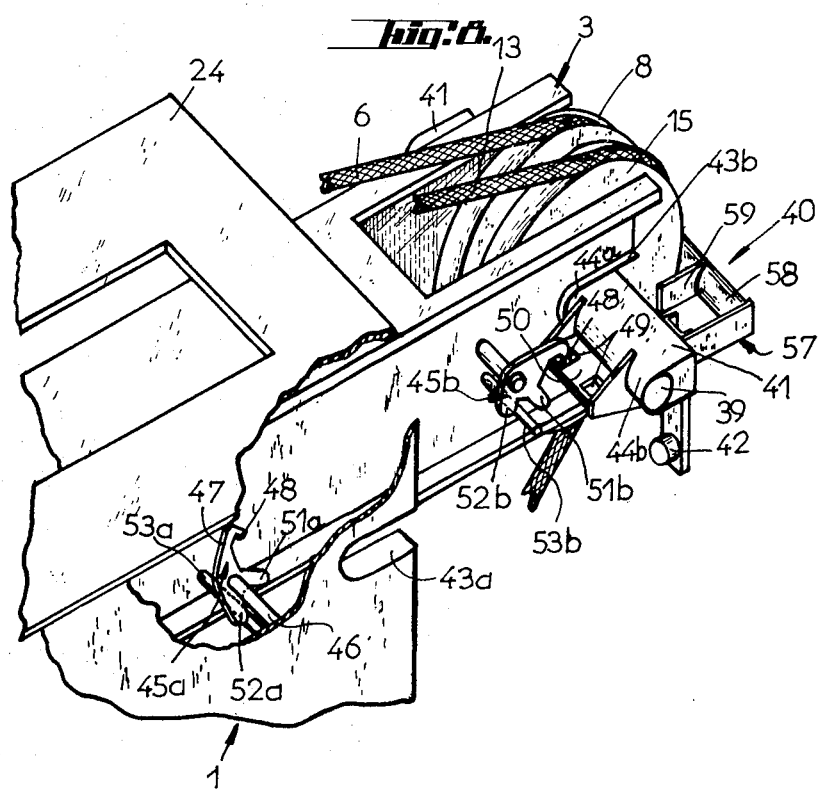

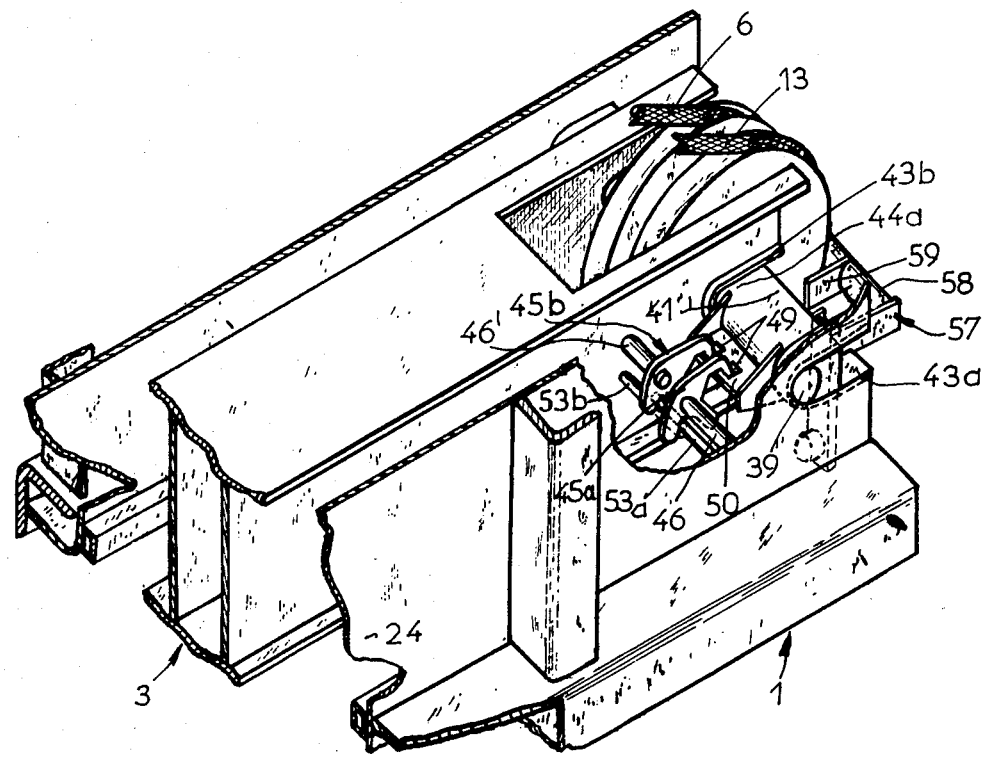

United States Patent Office 3,249,236
Patented May 3, 1966

3,249,236
TRANSFERABLE GUIDE PULLEYS FOR ROLLING OVERHEAD TELESCOPIC BRIDGE OR GANTRY CRANE
Henri Kummerman, Paris, France, assignor to MacGregor-Comarain, Paris (Seine), France
Filed Mar. 24, 1965, Ser. No. 442,351
Claims priority, application France, Mar. 25, 1964, 968,660
14 Claims. (Cl. 212—15)

The present invention has essentially for its objects a detachable end counter-motion device for the hoisting and/or translation ropes or chains of the movable handling trolley of a derrick or rolling-gantry crane having a telescopic or like girder laterally extensible in over-hanging relationship thereto, as well as the movable mechanical hoisting and handling conveying apparatus of this type which are equipped with such devices.

Such a hoisting apparatus has been described notably in the U.S. patent application Serial No. 419,351, filed on December 18, 1964, and entitled, "Improvements in or Relating to Device for Loading and Unloading Ships, Vehicles, Buildings and Fixed or Like Structures Equipped With Such Devices." In this title, there is described more particularly a hoisting arrangement of the aforesaid type wherein the handling trolley was displaceable in a continuous manner indifferently along the telescopic girder and the main gantry frame, that is from the free end of said telescopic girder in its outermost position to the opposite remote end of the main gantry frame. The translation or directional movement of the trolley, along the telescopic girder, is obtained by means of a rope traction and the trolley carries only the block or the pulleys supporting the hoisting rope and the load gripping member. The power-driven hoisting and translation control winch mechanisms are rigidly disposed or mounted in the frame-work structure of the main gantry frame and at least one pair of bilateral end return pulleys are provided for said ropes, respectively at the two ends of the gantry assembly, said pair being adapted to be transferred mutually or alternatively from one transverse end of the main frame to the corresponding outlet end of the telescopic girder and vice-versa, this transfer movement being produced automatically by bearing-forming support means provided respectively at either end of the main frame and of the telescopic girder. Thus, each end pulley is carried by one end either of the telescopic girder or of the main gantry frame, according as the telescopic girder is retracted within the gantry or extracted therefrom on the side of, or in the direction opposite to, said pulley, which is adapted to be either anchored, gripped, retained or caught automatically by the corresponding adjacent bearing rigid with the main frame and thus transferred thereto at the beginning of the extension or outward movement of the telescopic girder towards the opposite end, or returned to said girder at the end of its return or inward movement, which will then carry along said pulley during its outward movement in the opposite direction.

It is the object of the present invention to create a device permitting of implementing conveniently the aforesaid principle of operation and which is remarkable notably in that it comprises, for each end of the aforesaid derrick or gantry, on the one hand a movable assembly constituted by a substantially horizontal shaft extending at right angles to said gantry, carrying coaxially at least one pulley aforesaid and mounted in at least one structure element constituting a support bearing or the like, whilst the aforesaid support means, provided respectively at either end of the main frame and of the aforesaid telescopic girder, are adapted to receive said assembly through the medium of said element, and on the other hand means for retaining and locking said assembly in position in said support means and provided respectively on said frame and said girder.

Other features and advantages of the present invention will appear as the following description proceeds.

In the attached diagrammatic drawings given only by way of example and illustrating a form of embodiment of the invention:

FIGURE 1 illustrates in front view the gantry with its telescopic girder to illustrate the diagram of operation of the means controlling the directional movement of the movable trolley;

FIGURE 2 is a view similar to FIGURE 1 but showing diagrammatically the mode of operation of the control means for the hoisting member mounted on the movable trolley;

FIGURE 4 illustrates on a larger scale and in section taken approximately along the longitudinal axis the gantry with its telescopic girder in retracted position;

FIGURE 5 illustrates separately in perspective view the detachable assembly comprising the return pulleys of the hoisting and translation ropes and the trolley stop members;

FIGURE 6 illustrates a longitudinal axial fragmentary view of the respective left-hand end portions of the main gantry frame and of the telescopic girder pulled outwards to its overhanging position on the left-hand side;

FIGURE 7 is a view of the left-hand end portions, similar to the preceding one, but with the telescopic girder in relative outer position towards the right-hand side of the gantry;

FIGURE 8 is a perspective view showing the end of the gantry which corresponds substantially to FIGURE 6;

FIGURE 9 is a perspective view showing one end of the gantry in the retracted position of the telescopic girder;

FIGURE 10 is a perspective view of the gantry end corresponding to FIGURE 7;

FIGURE 11 illustrates in fragmentary view the top of the pulleys in the assembly of FIGURE 5, to show the rope guide means.

Figure 3:
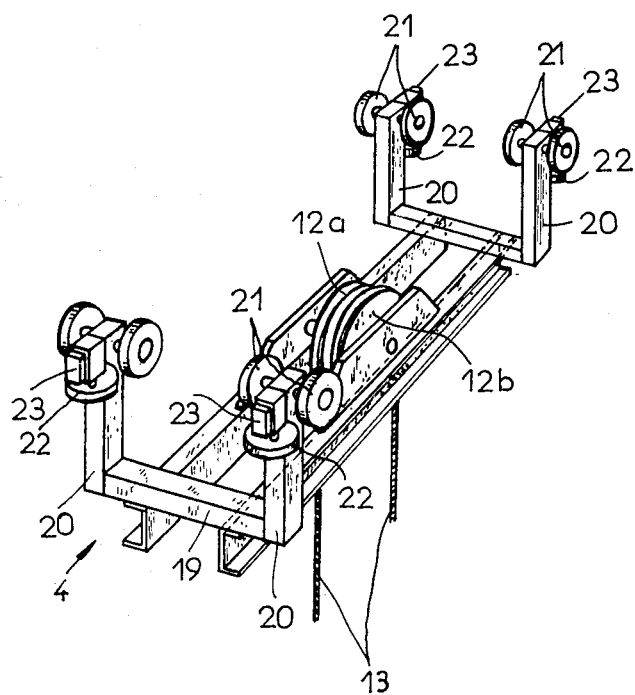
FIGURE 3 illustrates in separate and perspective view the handling trolley.

According to the form of embodiment illustrated in FIGURES 1 and 2, there is designated generally by the reference numeral 1 the main frame of a rolling gantry adapted to travel in a longitudinal direction, that is, at right angles to the transverse span of said gantry, on runways 2 of which only the tracks or rails 2 are shown for the sake of clarity and to simplify the drawing and facilitate the understanding. This beam-frame 1 of the rolling gantry carries a telescopic girder 3 adapted to slide in or move along the complete main frame 1 and to emerge in overhanging relationship therefrom, on the right-hand or left-hand side, beyond the corresponding end of said frame. In FIGURES 1 and 2 this telescopic girder 3 is illustrated in its outer position on the right-hand side.

The telescopic girder 3 carries a movable handling trolley 4 adapted to roll on the entire useful length of the telescopic girder 3 and frame 1 by moving continuously from the free projecting end of the telescopic girder to the opposite remote end of the frame 1 by being supported either from the telescopic girder alone when the trolley lies on the overhanging portion thereof, or simultaneously from the telescopic girder and the main frame when the trolley lies on the telescopic girder section left within the main frame 1, or finally from the main frame 1 alone when the trolley having left the telescopic girder in its outer position on the right-hand side lies on the left-hand portion of the main frame, beyond the inner retracted end portion of said telescopic girder.

The means for controlling the directional movement of the trolley, that is, its translation by rolling along the telescopic girder 3 and main frame 1, is shown diagrammatically in FIGURE 1 and comprises at least one power-driven winch, for example a single winch, mounted permanently on the main frame 1 and comprising two winding drums 5a and 5b revolving preferably in opposite directions and having their axes disposed substantially horizontally and parallel, at right angles to the direction of travel of the trolley 4, and adapted to be driven from a common electromotor. A rope, for example a single rope 6, is adapted to be wound with one end on said drum 5a, or to be payed out therefrom, and from this drum the rope passes over an end return pulley 7 carried in the case of the exemplary arrangement of FIGURE 1 by the left-hand end of the main frame 1, then extends along said main frame and along the telescopic girder to reach the movable trolley 4 and is rigidly attached to the frame structure of this trolley; then it passes over another end return pulley 8 carried in the present case by the free outer right-hand end of the telescopic girder 3 and returns subsequently along the telescopic girder and main frame so as to be wound on the second drum 5b.

To avoid any interference or accidental engagement between the upper run of rope 6 and the horizontal beams (not shown) supporting the runways or tracks 2, notably on the outer side of the telescopic girder 3 when the latter is moved to its overhanging position, the upper run of the rope 6 extending from the respective drums 5a and 5b passes over a pair of deflection guide pulleys or jockey pulleys 9 mounted respectively at fixed locations to each transverse end of the main frame 1, the rope 6 passing respectively over the inner guide pulley and then under the outer guide pulley, so as to be directed substantially horizontally along, and in close vicinity of, the outer overhanging horizontal portion of the telescopic girder 3 by passing beneath the corresponding gantry beam of the main frame.

To move the movable trolley 4 in one or the other direction the two drums 5a and 5b are rotated in synchronism in opposite directions of rotation so that one of the drums will wind up the rope 6 while the other drum pays out said rope simultaneously. To this end, each one of the two drums 5a and 5b is adapted to be disconnected separately from the common motor, for example by means of manual or remote control means from a control cab or board, so as to permit the free unwinding of the rope 6 as a consequence of the traction exerted thereon by the telescopic girder when the latter is moving outwards. To simplify the drawings, the system or mechanism for controlling the translation of the telescopic girder is omitted therefrom. A safety interlocking or locking system, operated for example electrically, will prevent any faulty manoeuvre resulting for example from a defect or inadvertently forgetting of making the aforesaid disconnection when it is desired to pull out the telescopic girder to its overhanging position. When it is desired to cause the telescopic girder to be pulled out from the right-hand side, as in FIGURE 1, the drum 5a is disconnected and locked or held against rotation while the nearly free rotation of drum 5b is braked or controlled by the electromotor providing a predetermined reaction torque in order to keep the rope 6 properly tensioned. To this end, the electromotor is fed for example with a view to operate same under reduced power output conditions.

FIGURE 2 illustrates the operative diagram of the hoisting control means, that is, of the means for raising or lowering the load gripping member suspended from the handling trolley. The member may consist for example of hoisting hook 10 suspended from the strap of a suspension and return pulley 11. Since the trolley 4 is simply pulled by the aforesaid rope 6, it carries by itself only the return and suspension pulleys 12a and 12b for the hoisting rope designated in this case by the reference numeral 13. The hoisting system will thus comprise mainly a power hoisting winch shown simply in the form of its driving drum 14. This winch controlled preferably electrically, is also mounted permanently in the framework structure of the main gantry frame 1.

The hoisting or load rope 13 is wound at one end on the drum 14 and from this drum passes over an end return pulley 15 carried detachably by the free, overhanging outer end of the telescopic girder 3, and then extends with its lower run along the lower side of the telescopic girder 3, before passing in succession over the pulley 12b of said trolley, over the pulley 11 of the hoisting block assembly, then over the pulley 12a of the trolley along the lower frame member of the telescopic girder and main frame to another return pulley 16 carried by the remote end of the main frame, to lead finally with its other end to a fixed point 17 of the framework structure of the main frame 1. As in the system controlling the steering of the movable pulley, there are provided at least one pair of return pulleys or rollers 18 mounted permanently for example at least near the right-hand end of the main frame 1, and having a function similar to that of the guide pulleys 9, in that they are intended to deflect the hoisting rope 13 when the telescopic girder 3 is pulled to the right-hand side to avoid any interference with the beam supporting the runway 2 of the gantry.

The hoisting member or equipment consisting of the assembly of hook 10 with its suspension block 11 is preferably weighed, for example by means of a 300-kilogram weight, for ensuring the normal return or downward stroke in the empty condition of this assembly by its inherent gravity.

The operation of this hoisting system is obvious. When the handling trolley is stationary with respect to the gantry, winding the hoisting rope 13 by means of the power drum 14 will cause the hoisting hook to rise, and unwinding this rope will cause the downward movement of the same hook. When the handling trolley travels along its runways and it is desired to keep the hook 10 at a constant height or level, it is necessary to cause the drum 14 to revolve simultaneously in a co-ordinate manner with respect to the movement of translation of the trolley, either in the winding direction when the trolley is moving to the right, or in the unwinding direction when the trolley travels in the opposite or leftward direction.

FIGURE 3 shows the configuration of the handling trolley. This trolley consists of a framework 19 supporting approximately in its middle the two return pulleys 12a, 12b of the hoisting rope 13 which, for reasons of convenience, are mounted side by side in a common strap to constitute a suspension block. The framework 19 of the trolley comprises four uprights 20 through which the trolley is suspended from the gantry. To this end, each upright 20 carries on its upper portion at least one pair of wheels or rollers 21 disposed preferably coaxially and on either side of said upright, whereby their axis be substantially horizontal and perpendicular to the direction of translation of said trolley. These rollers are adapted to bear and roll on adequate runways or tracks provided aong the lower portion of the main gantry frame 1 and telescopic girder 3. Each upright is furthermore advantageously provided, at its upper portion, with at least one lateral guide roller 22 revolving about a substantially vertical axis, adapted to engage by rolling contact corresponding lateral guide tracks on the main frame 1 and telescopic girder 3. Each upright 20 is finally advantageously provided, on its face directed outwards in the direction of travel, with a bumper or like member 23 adapted, at the end of the useful stroke of the trolley, to abut against suitable buffer-stops disposed at the free overhanging end portion of the telescopic girder 3 and at the opposite remote end of the main frame 1.

For reasons of convenience, it is advantageous to dispose the pulleys 7 and 16 on the one hand and 8 and 15 on the other hand respectively co-axially in a common strap to constitute a kind of block, respectively at the end of the main frame 1 and at the free projecting end of the telescopic girder 3, or vice versa.

The structure of the main frame 1 of the rolling gantry and that of the telescopic girder 3 is shown in FIGURE 4. The main frame 1 consists essentially of a hollow beam, having at least a partial box-sectioned structure, with a cross-sectional contour of substantially inverted U-shaped configuration, that is, with a substantially horizontal web and substantially vertical depending flanges, in which the telescopic girder 3 is mounted, this girder consisting for instance of an elongated, I-sectioned box-sectioned member comprising two parallel vertical spaced webs 25a, 25b and a pair of lower and upper horizontal flanges 26a, 26b, respectively. The longitudinal edges of these flanges project laterally outside from the aforesaid vertical webs.

The telescopic girder 3 is supported by the lower face of the lateral longitudinal edges of its upper flange 26b by means of pairs of rollers 27, preferably substantially coaxial with, and having their axes substantially horizontal and perpendicular to, the direction of movement of said telescopic girder 3. These rollers 27 disposed on either side of the telescopic girder are mounted permanently respectively on the two vertical arms or flanges of the U-sectioned beam constituting the main frame 1. Thus, the telescopic girder is adapted to roll through the edges of its upper flange on the roller 27 disposed by pairs at spaced intervals along the main frame 1.

The telescopic girder 3 is guided laterally by a series of pairs of rollers 28 having substantially vertical axes, mounted permanently inside the main frame 1 on either side of the telescopic girder and disposed at spaced intervals along the main frame 1. These rollers co-act by rolling contact with the end outer face or edge of the lateral marginal portions of the upper flange 26b.

To prevent the tilting of the telescopic girder in the overhanging position in which the upper flange might move away from the rollers 27, by lifting or moving away therefrom, so as to become unsupported thereby, other rollers 29 having substantially horizontal axes are provided at spaced intervals and mounted permanently but through vertical adjustment means inside said frame and adapted to be brought in rolling contact with the upper face of the upper flange 26b, preferably substantially in alignment with a web 25 of the telescopic girder.

The lower longitudinal edges of the lower flange 26a of said telescopic girder 3 are used to constitute runways and supports for the lower rollers 21 of the handling trolley, and the outer rollers 21 of this trolley engage, and roll respectively on, a pair of corresponding runways consisting of the marginal portions 30 registering therewith and solid with the inner face of the vertical sides of the main U-sectioned frame so as to project respectively inwards therefrom, so that their upper faces be substantially level and co-planar with respect to the upper face of the lower flange 26a of the telescopic girder. The registering vertical end faces of the runways 26a and marginal portions 30 are used as runways to the lateral guide rollers 22 of the trolley, which rollers are located respectively between said registering end faces.

The operator's control cab 31 containing the gantry control board is suspended from the side and beneath the main frame 1. To this end the cab 31 is suspended by means of elastic blocks 32 from a suspension framework 33 comprising on the one hand rollers 34 having substantially horizontal axes, which bear and roll on a horizontal runway consisting of a longitudinal marginal portion 35 solid with the outer face of the lower end of a vertical flange of said main frame 24. The assembly is guided laterally by means of at least one pair of rollers having substantially vertical axes, respectively a lower roller 36 and an upper roller 37. Each lower roller 37 is in rolling contact with a substantially vertical outer wall or surface of the lower end of said vertical flange of the main frame 24 with a unilateral contact, while each upper roller 36 is adapted to engage bilaterally by rolling contact the inner face of the vertical flanges of an inverted U-sectioned member having a horizontal web, solid with the outer vertical wall of the main frame, at the upper portion thereof, and adapted to prevent the lateral tilting of the cab. This cab further carries at least one stop member 38 providing a lateral contact with the runway of the lower guide roller 37 but on the inner face of said runway, said last-named stop member being also adapted to prevent the tilting of the cab in the other direction. The motor controlling the cab translation along the main frame of the rolling gantry is housed and supported in the suspension framework 33. The telescopic girder control mechanism is not shown in order to simplify the drawings.

The cab translation is produced by the traction of ropes (not shown).

The proper operation of the systems controlling the aforesaid translation and hoisting ropes requires that each pair of pulleys 7–16 and 8–15 be transferable immediately the one from the end of the telescopic girder to the corresponding end of the main frame and the other from the opposite end of the main frame to the corresponding end of the telescopic girder. To this end, the two pulleys of each pair of pulleys aforesaid are advantageously mounted on a common shaft 39 carried at its opposite ends by a pair of bilateral bearings constituting with said shaft a detachable assembly 40 shown in perspective view in FIGURE 5 illustrating the assembly with the pair of pulleys 8–15 located at the right-hand end of the rolling gantry. Each supporting bearing 41 consists preferably of a box-sectioned member having a considerable rigidity or mechanical resistance to torsional stress, with a somewhat elongated and flat configuration. Secured to each box-sectioned member and preferably near the longitudinally outer end thereof, is an element 42 constituting a stop member adapted to co-act with the corresponding bumper 23 of the handling trolley. This bumper is somewhat shifted beneath the box-sectioned member with which it is associated.

Instead of two end box-sectioned members 41, it is also possible to provide only a single box-sectioned member located for example in the middle of shaft 39, intermediate the pulleys 8 and 15.

For receiving and supporting each box-sectioned member 41 during a transfer movement aforesaid, each end portion of the main frame 1 and of the telescopic girder 3 comprises externally at least one recess or cavity 43 forming a notch, hollow, groove, slot or the like, open or opening into the vertical outer edge of said end portion and having preferably substantially parallel and horizontal edges and, if desired, a rounded bottom. In the present instance there is provided at either end of the rolling gantry a pair of recesses or notches 43a consisting respectively of the vertical flanges of the main frame 24 and a pair of notch-forming recesses 43b formed respectively on the two vertical webs 25a, 25b of the telescopic girder. To this end, each box-sectioned member 41 comprises two respectively internal and external bearing and supporting surfaces 44a and 44b, substantially conjugate with the notch-forming recesses respectively on a vertical web of the telescopic girder and on the vertical flange of the main frame, so that each box-sectioned member will fit through these bearing surfaces in the corresponding notches on the telescopic girder and the main frame as shown in chain-dotted lines in FIGURE 5. When the telescopic girder is fully retracted in the main frame (see FIGURE 9), the two box-sectioned members of each assembly are supported simultaneously by the four notch-forming recesses located respectively by pairs at the corresponding end of the main frame of the gantry and of the telescopic girder, and on the other hand when the telescopic girder is pulled out from one side (see FIGURES 6 and 8) the box-sectioned members 41 of the pulley system 40 carried by the free overhanging end of the telescopic girder are supported only by their internal bearing surfaces 44a by means of the notch-forming recesses 43b of the telescopic girder alone and the pulley system, which is carried by the opposite remote end of the main frame of the gantry, is supported through its external bearing surfaces 44b in notch-forming recesses 43a of the main gantry frame alone (see FIGURES 7 and 10).

Each pulley system aforesaid is locked, held against motion or retained in its recess at one end of the gantry by means of at least one pair of movable latches and preferably two pairs of movable latches 45a and 45b corresponding preferably to the aforesaid notch-forming recesses and carried respectively by the main frame and the telescopic girder. As shown in FIGURES 6 to 10, each latch aforesaid consists of a vertically pivoted lever constituting a kind of oscillating door-latch, lyre or the like, mounted on a substantially horizontal pivot pin 46', 46 carried by a web of the telescopic girder or by the inner face of a vertical flange of the gantry frame. The two pairs of levers at each end of the gantry are disposed preferably symmetrically with respect to the vertical longitudinal axial plane of the gantry.

Each lyre 45a, 45b comprises preferably at least three arms of which one 47 has its free end formed preferably with a curved catch 48 acting as a hook or the like and adapted to engage a corresponding locking orifice or recess 49 forming a keeper, catch or the like, provided on said assembly, for example in a substantially horizontal plate-bracket 50 rigid with one end of a box-sectioned member 41, substantially in alignment therewith on the side opposite to that of said stop member 42. The other two arms 51, 52 of each lyre are so disposed as to co-act by turns with stop members solid respectively with the main frame and the telescopic girder.

These stop members consist in this example of two pairs of projections 53a, 53b in the form of substantially horizontal pins, spindles, pegs, shafts or the like, secured on the inner registering faces of the vertical flanges of the main frame and on the telescopic girder on either side thereof. Each control pin such as 53a or 53b has a length sufficient to act, possibly but optionally, on the one hand as a limit stop for releasing the lyre 45a or 45b carried by the same structure as itself (main frame or telescopic girder), and on the other hand as a control member for locking or releasing the lyre 45b or 45a carried by the registering relatively movable structure telescopic girder or main frame). Thus, the control pins 53a carried by the main frame may act respectively as limit stops at the end of the rotational release stroke of lyres 45a carried by the same main frame and as means for controlling the locking and release of the lyres 45b carried by the telescopic girder. Similarly, the control pins 53b carried by the telescopic girder may be used as limit stops at the end of the rotational locking movement performed by the lyres 45b carried by the same telescopic girder and as means for controlling the locking and release of lyres 45a carried by the main frame.

Elastic return means of the reversible type are associated with each aforesaid latch or lyre for constantly and preferably abruptly urging same against either of its two end stable opposite locking and release positions, defined if desired by the aforesaid fixed stop members, when a certain unstable intermediate position is overstepped. For each lyre this elastic return means will advantageously consist of a flexion spring of the blade or rod type 54 pivoted on the one hand to a fixed point 55 rigid with the structure supporting the lyre concerned and on the other hand to said lyre at a point 56 separate from the axis of rotation of pin 46 (see FIGURES 6 and 7).

With each pulley 7, 16 or 8, 15 of each assembly 40 there is associated a rope-guide 57 rigid for example with the relatively fixed structure of the assembly and adapted to prevent the rope passing over said pulley from escaping or coming off accidentally, for example in case of a tension release from the groove of said pulley.

This rope-guide may consist for instance of a bar or like member 58 rigid with the box-sectioned member 41 and extending in front of each pair of pulleys 7, 16 or 8, 15, parallel to the pulley axes and carrying two pairs of plates or flanges 59 enframing the two pulleys respectively (see FIGURE 11).

This simple, reliable and automatic lockable transfer device operates as follows: From the initial configuration illustrated in FIGURE 6 or 8 in which the telescopic girder 3 is assumed to have been pulled out to the overhanging position on the left-hand side of the rolling gantry, the pulley assembly 40 is located endwise of the free left-hand end of the telescopic girder in the notch-shaped recess 43b and is locked in this position by the engagement of the two lyres 45b mounted respectively on either side of the telescopic girder, in the corresponding orifices 49 of the plate-bracket 50 of said assembly. The lyres 45b are resiliently held in this locking position by the action of their associated springs 54. FIGURE 6 also shows the position of the rollers 21 and hoisting suspension pulleys 12a, 12b of the handling trolley, assumed to have completed its stroke to the left of the telescopic girder, so that its bumpers 23 engage the abutment members 42 solid with the assembly 40. The lyres 45a carried by the corresponding end of the main frame 1 are in their raised released position and resiliently urged to this position by the action of their companion springs 54 holding the lyres 45a in contact through their arms 52a with the control pin 53a acting as a limit stop to these lyres. In the position of engagement of the assembly 40 in the recess 43b, as shown, the box-sectioned members 41 engage these notches home, and bear against the walls of these notches with their respective bearings 44a.

When the telescopic girder is moved to the right for retracting same into the main frame, the outer bearings 44b of box-sectioned members 41, which had been free as long as the girder was pulled out from the main frame, will engage (at the time when the recesses 43b of the telescopic girder are in alignment with the recesses 43a of the main frame) the recesses 43a of this frame, down to the bottom thereof, and, simultaneously, the pins 53b carried by the telescopic girder engage the arm 52a of lyres 45a carried by the main frame, so as to tilt them in the clockwise direction from the raised release position to the lowered locking position in which the lyres 45a engage with their hooks 48 the orifices 49 of assembly 40, thus holding same against motion in the notches 43a of the main frame. Thus, when the telescopic girder 3 is retracted completely within the main frame 1 of the gantry, the two pairs of lyres 45a and 45b carried respectively by the main frame and by the telescopic girder are in their lower locking position, that is, the position in which their hooks 48 engage the orifices 49 of assembly 40 (see FIGURE 9). As the telescopic girder continues its movement to the right, the arm 51b of lyres 45b carried by the telescopic girder, which is in its lower locking position, engages the fixed pins 53a carried by the main frame which, by reacting thereagainst, cause them to tilt upwards to the release position in order to free the assembly 40, whereby the girder 3, by continuing its movement, will thus release the assembly 40 which remains locked in position in the left-hand end of the main frame, while the lyres 45b carried by the telescopic girder are kept in the locked position by the action of spring 54 and are caused possibly to abute against the control pins 53b carried by said telescopic girder (see FIGURES 7 and 10).

For pulling the opposite end of the telescopic girder out from the right-hand side according to the arrangement illustrated in FIGURE 7, or returning same to its initial position on the left-hand side, as illustrated in FIGURE 6, the manoeuvre takes place exactly in the reverse sequence of the various operations just described, whereby the projecting end of the telescopic girder, as it moves past the corresponding end of the gantry frame, will carry along the pulley assembly 40 which will thus leave said end of the main frame so as to be supported by the homologous end of the telescopic girder and be locked by means of the relevant lyres. In the configuration of FIGURE 7, it will be seen that the stop members 42 of the pulley assembly 40 are in their position corresponding to the end of the useful stroke of the handling trolley, on the main gantry frame, opposite the projecting end of the telescopic girder.

When the handling trolley 4 completes its stroke and engages the bumpers 42, the horizontal stress caused by this shock is supported and balanced by the reaction produced on the pivot pins of lyres 46 or 46' which are now locking the pulley assembly, whereas the tilting or rotational moment produced by said shock is balanced by the bearing or coupling reaction exerted by the walls of the notches on the box-sectioned members without causing the pin or shaft 39 of the pulleys which is carried by said assembly 40 to receive any fraction of these stresses.

Of course, the invention should not be construed as being limited by the specific forms of embodiment described and illustrated herein which are given by way of example only.

What I claim is:

1. A power-driven overhead travelling crane comprising a rolling bridge; a telescoping boom of substantially the same length as said bridge and slidably supported therein and reciprocally shiftable endwise from a retracted position inside of said bridge to an outward extending position wherein it projects at least in part from either side end of said bridge; a rolling crab riding on said boom and continuously movable along the full length of both of said bridge and boom from the free extreme projecting side end of said boom in its outward extended position to the opposite remote extreme side end of said bridge, thus being indifferently supported by either of said bridge and boom; load carrying means with a pendent block supported from said crab and adapted for vertical movement to and from said crab; at least one motorized crab haulage winch carried by said bridge and provided with at least one pair of reversibly counter-rotating cable winding drums; at least one pair of crab haulage cables wound on said drums, respectively, with opposite end portions extending therefrom out to the opposite side ends of said crane, to be reeved around a pair of haulage end sheaves respectively carried endwise by said opposite side ends of said crane and thence back toward each other for being dead-ended on said crab; at least one motorized hoisting winch carried by said bridge and provided with at least one rope winding reversibly rotating drum; at least one lifting rope for raising and lowering said load carrying means, wound on said drum and extending therefrom out to one side of said bridge where it is reeved about a hoisting end sheave carried by said one side end of said crane, thence back to said crab where it passes over a first sheave on the latter, thence downwards and about said pendent block, thence upwards about a second sheave on said crab, thence to and about another hoisting end sheave carried by the other side end of said crane for being made fast on said bridge; both of said haulage and hoisting end sheaves at each side end of said crane being rotatably mounted on a common sheave supporting frame which is removably received in corresponding frame-bearing means provided on said side ends of said bridge and of said boom whereby each sheave-supporting frame is reciprocally transferable from said boom to said bridge and viceversa to be only supported by either of them when said side end of said boom moves past said corresponding side end of said bridge, whereas said sheave-supporting frame is supported by both the bridge and the boom when this latter is entirely retracted inside said bridge.

2. A device according to claim 1 comprising safety bumper means for said crab which are integral with said sheave supporting frame and adapted to be engaged by and to stop said crab at the end of its travelling path.

3. A device according to claim 1 comprising self-acting releasable locking means provided at each side end of said boom and said bridge, respectively, for retaining said sheave-supporting frame and reciprocally operable by the motion of said boom.

4. A device according to claim 1 wherein each side end of said bridge and boom, respectively, is formed with an elongated blind recess opening outwards and extending substantially parallel with the direction of motion of said boom, for accommodating said sheave-supporting frame and constituting said frame-bearing means.

5. A device according to claim 4, comprising safety bumper means and wherein each elongated recess is formed with substantially straight parallel coextensive edges and said sheave-supporting frame is formed with at least one pair of substantially flat parallel top and bottom faces adapted to slidingly engage said edges, respectively, said bumper means being located outside of the longitudinal centerline of said recess.

6. A device according to claim 1, comprising locking means at each side of said boom and said bridge and wherein said locking means consist, at each side end of said crane, of at least one pair of multi-armed rocking levers pivoted to said boom and bridge, respectively, and formed each one, with a hook-shaped arm engageable in the locked position with relevant bolt-clasp means on said sheave-supporting frame, and also with two other arms arranged in angularly spaced relationship and separately and alternatively engageable by their mutually facing inner edges with relevant abutting catch means to cause said lever to rock in either direction consistently with the direction of motion of said boom, whereby said rocking lever on one side end of said boom is operated by engaging an abutting catch integral with said bridge in locking and unlocking direction according as said boom end moves out and past said bridge end respectively, while said rocking lever on said bridge is correspondingly operated in unlocking and locking direction upon engagement with an abutting catch integral with said boom.

7. A device according to claim 6 wherein each rocking lever is provided with snap-acting spring means for urging said lever toward either of its locking and unlocking positions upon overstepping an intermediate unstable position.

8. A device according to claim 1, comprising cable holding means on each sheave-supporting frame for guidingly retaining said cables and ropes on said end sheaves.

9. A device according to claim 1 comprising self-acting releasable locking means provided at each side end of said boom and said bridge, respectively, for retaining said sheave-supporting frame and being reciprocally operable by the motion of said boom.

10. A device according to claim 1, comprising locking means at each side of said boom and bridge and wherein said locking means consist, at each side end of said crane, of at least one pair of multi-armed rocking levers pivoted to said boom and bridge, respectively, and each formed with a hook-shaped arm engageable in the locked position with relevant bolt-clasp means on said sheave-supporting frame, and, also, with two other arms arranged in angularly spaced relationship and separately and alternatively engageable by their mutually facing inner edges with relevant abutting catch means to cause said lever to rock in either direction consistently with the direction of motion of said boom, whereby said rocking lever on one side end of said boom is operated by engaging an abutting catch integral with said bridge in locking and unlocking direction according as said boom end moves out and past said bridge and respectively, while said rocking lever on said bridge is correspondingly operated in unlocking and locking direction upon engagement with an abutting catch integral with said boom.

11. A device according to claim 10, wherein each rocking lever is provided with snap-acting spring means for urging said lever toward either of its locking and unlocking positions upon overstepping an intermediate unstable position.

12. A device according to claim 1, wherein each side end of said bridge and boom, respectively, is formed with an elongated blind recess opening outwards and extending substantially parallel with the direction of motion of said boom, for accommodating said sheave-supporting frame and constituting said frame-bearing means.

13. A device according to claim 12, wherein each elongated recess is formed with substantially straight parallel co-extensive edges and said sheave-supporting frame is formed with at least one pair of substantially flat parallel top and bottom faces adapted to slidingly engage said edges, respectively, and safety bumper means located outside of the longitudinal centerline of said recess.

14. A device according to claim 1, comprising cable holding means on each sheave-supporting frame for guidingly retaining cables and ropes on said end sheaves.

References Cited by the Examiner
UNITED STATES PATENTS

| | | | |
|---|---|---|---|
| 3,006,485 | 10/1961 | Mortin | 212—15 X |
| 3,063,572 | 11/1962 | Bevard | 212—15 |
| 3,204,780 | 9/1965 | Holt et al. | 212—15 |

EVON C. BLUNK, *Primary Examiner.*

A. LEVINE, *Assistant Examiner.*